Dec. 8, 1936.  J. F. WAIT  2,063,862
PROCESS OF REFINING PETROLEUM OIL
Filed May 24, 1933
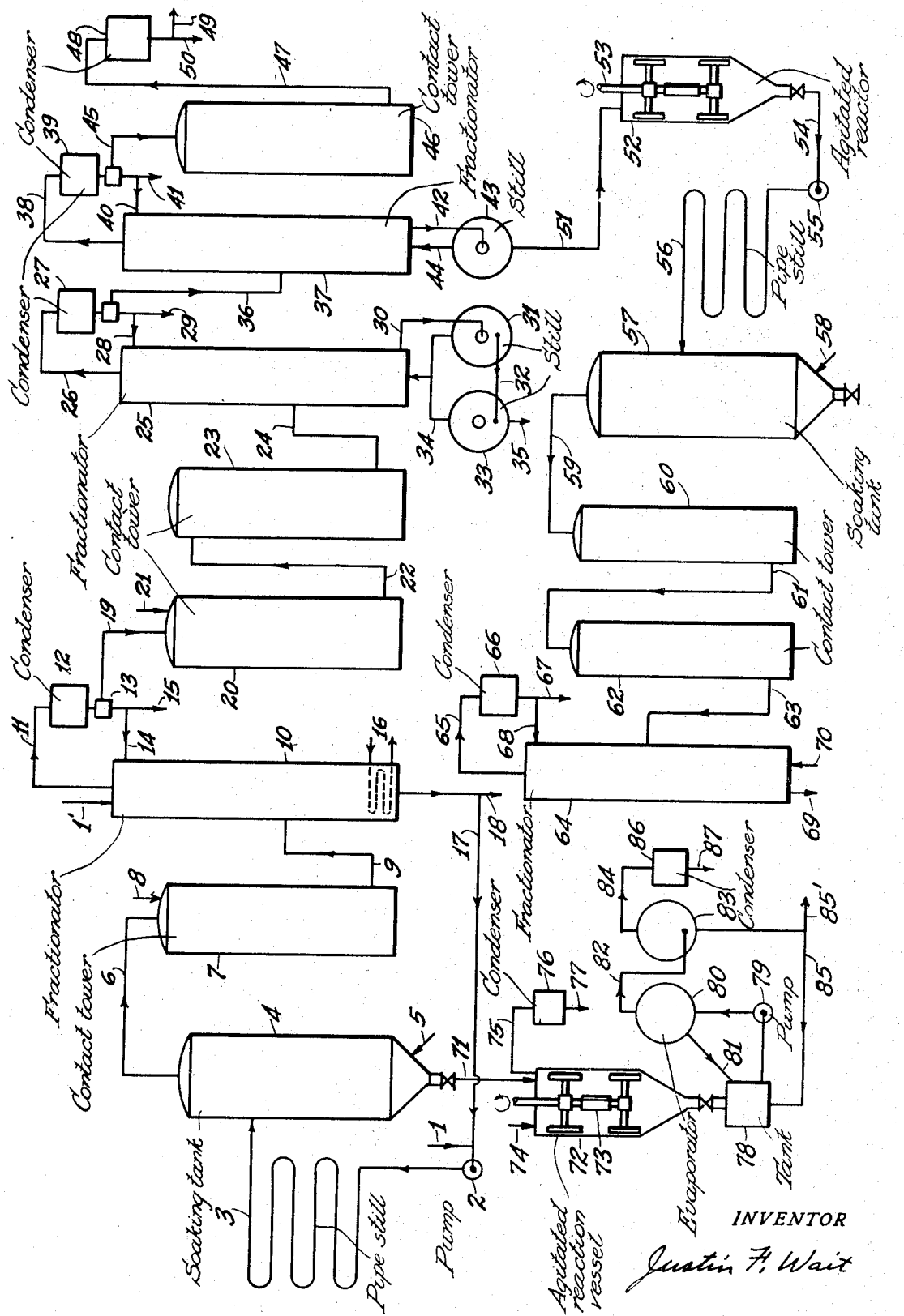
INVENTOR
Justin F. Wait Patented Dec. 8, 1936

2,063,862

UNITED STATES PATENT OFFICE 2,063,862

PROCESS OF REFINING PETROLEUM OIL

Justin F. Wait, New York, N. Y.

Application May 24, 1933, Serial No. 672,573

11 Claims. (Cl. 196—35)

This invention relates to improvements in the art of refining petroleum and wherein active light metal is utilized for treatment of the oil. In particular it refers to the combination of such treatment with metal and special fractionation methods utilized to cooperate therewith in removing impurities and altering the molecular structure of the oil. This application is in part a continuation of Ser. Nos. 671,187 filed May 15, 1933; 671,616 filed May 18, 1933, and 671,895 filed May 19, 1933.

Among the light active metals which may be applied for the treatment of oil are those with one unpaired electron including sodium, potassium and aluminum. Such metals may be utilized in association with compounds of such metals my preference being for hydroxide and chlorides appropriately mixed to give desired activity and fluidity. The temperature of application is preferably between 250° C. and 500° C. wherefor I take advantage of the high degree of activity of the petroleum as well as the metal. The metal may be at the same temperature as vapors of oil being treated or at a higher temperature. A portion of the oil may be treated in the liquid phase.

Although it has been suggested that alkali metals and alkaline earth metals might be used for treating oil, the proposed application appears to have been limited to the removal of sulfur or sulfur compounds from gasoline. The suggested and described methods of application fail to provide for conditions which are necessary to the realization of a practical effect and in particular they fail to recognize that extensive purification and molecular rearrangement of oil may be promoted by application of such metals and compounds in proper manner. It has previously been considered desirable to use temperatures below about 200° C. and in some instances room or lower temperatures. Proper contact has not been assured or the method has been such as to prevent continued use of a mass of metal or adequate recovery thereof. Compounds have not been utilized with such metals and if at all in a wet condition. The metals have not been applied to freshly formed or freshly treated oil and vapors and their use has been limited to oils which have been altered considerably by storage.

By one phase of my invention appropriate portions of freshly treated and formed oils are contacted with metals and compounds. Oil is cracked and the vapors of light cracked products are quickly treated by a molten stream containing light active metal at between 200° C. and 500° C. while the heavy oil, residual to the vapors is separately treated and preferably at between about 200° C. and 350° C. Under the conditions of the treatment molecular rearrangement takes place and impurities are removed with a resulting increase in stability and general improvement of properties of the oil. Losses entailed in operation in other manners are reduced or eliminated. I am thus able to beneficially treat oils of all range.

Prior art has involved treatment of old oil to such a slight extent that there has been no appreciable consumption of alkali metal whereas I control the conditions so that there is a decided consumption which under preferred conditions is considerably in excess of 1 lb. per bbl. and generally between about 5 and about 20 lbs. per bbl. of oil processed. Treatment with metal is combined with heating to cause cracking and rearrangement to the extent that each is required. Mild oxidation is applied before or between treatments with active molten mass to yield desired form and stability. Such oxidation is appreciably less than that previously applied and is extended to a degree that the metal treatment will yield high or highest stability.

The particular mode of operation to be used is dependent upon the nature of the oil and the products desired. It cannot be predetermined and is established by testing oil to be treated by several combinations. In general I establish zones of heating, fractionation and treatment with a molten mass. The oil in liquid or vapor form is advanced and treated in special manner and generally while hot and without cooling and lengthy storage which I have found to be generally detrimental. Prior applications disclose many steps usable in this invention and indicate results obtainable. By combining such steps it becomes possible to avoid or reduce deficiencies obtained when the steps are not coordinated as indicated herein.

I have found that some portions of oil are benefited by coacting treatments while other portions may be marketed with less treatment or another kind of treatment. To accomplish this I apply a multiplicity of treatments and separate portions between treatments. Such separation is preferably of the heavy portions which may be removed and separately treated or recirculated through one zone of treatment to further promote the rearrangement thereof after portions have been separated from the oil on its first treatment. From one point of view some vaporous portions are thus continuously advanced through a multiplicity of treating stages.

When the treated product is to be of low oxidation, sludge, gum or equivalent value, it is very desirable and generally preferable to mildly oxidize the oil at one or more points in the refining system and I prefer to apply the metal, or compound, or both after each point of oxidation to remove substantial portions of unstable matter rendered removable by the oxidation. The controlled mild oxidation is followed by a special treatment with molten mass containing active light metal such as an akali or aluminum with one unpaired electron. The degree of such subsequent application is carefully controlled to yield about a maximum resistance to air oxidation and to yield a stable product. The oxidation may be combined with absorbent action of the oxidant as for example in the case of mixtures of nitrated (mono and di) aromatic substances which may be contacted therewith as by stream flow, thus for example a stream of liquid containing nitrobenzene may be flowed through a contact zone through which vapors of oil to be treated are flowed. External to the contact zone, absorbed substances may be separated and the treating agent reused. Substances such as some heavy ethers or carbon dioxide may be similarly applied for treatment of portions of some oils at one stage.

With oils which normally produce gasoline of high gum value, my process of applying alkali metal generally reduces gum value by a substantial amount. If treatment by oxidation or with substances equivalent to nitrated aromatic compounds, as above indicated, is applied before treatment with the metal, gum values may be reduced to substantially zero as measured by the copper dish test after storage of about a month. With oil of lubricating range the demulsibility and viscosity index are greatly increased by treatment of the metal alone and the Conradson value is generally reduced to about zero. If the portion of oil of lubricating range is first treated with an oxidant of the kind indicated and subsequently treated with alkali metal, the final result is an oil which forms but very little sludge and which deposits practically no carbon on use in a gasoline engine. The mildly oxidized oil after treatment with alkali metal may, with proper operation, be possessed of zero organic acidity after extensive use in a gasoline engine and the tar number thereof is substantially zero after about 90 hours of test. Oils which are formed from freshly cracked petroleum with subsequent digestion, such as by refluxing, are especially stable. Such treatment improves the yield of high grade lubricant after alkali metal has been applied thereto and especially if mild oxidation is applied before application of the metal.

My process may be carried out as illustrated in the drawing. Oil is supplied through line 1 to pump 2 supplying pipe still 3 discharging oil and vapors into "soaking" tank 4 which I prefer to have in multiple, series connected as regards flow of oil which is residual to the formation of vapors. One or more such "soaking" tanks may be used and each may be provided with a pipe still for heating and mixing. Line 5 may be utilized to flow liquid oil or vapors or gases into the liquid within tank 4. Vapors flow through line 6 to contact tower 7 provided with circulating and activating means for molten mass containing alkaline compound such as alkali hydroxide or metal or both. Active vapors or gases may be introduced through line 8 and treated vapors flowed through line 9 to fractionator 10 with vapor outlet 11, condenser 12 and separator 13. The vapors or gases introduced at 8 may be those subsequently recovered in the system. These may become in part associated with oil treated or may become self associated in part or both. Backflow is returned through 14 and forward-flow may be discharged from 15 if desired. Heating coil 16 may be utilized for evaporation if desired or external means may be applied. Oil to be treated may be flowed through line 1' and the outflow from line 17 may be passed to the pump 2. A portion of heavy oil from 10 may be flowed from line 18 and utilized or further treated. In some instances it is desirable that oil entering at 1' be pretreated as by an active metal in compound as by that means improvement in quality is obtainable.

If the oil to be treated contains much light product, column 10 is usable to "top" the oil. Such oil is previously treated to remove water and in some cases is preferably mildly oxidized by a mild oxidant such as a nitrated organic body particularly where low gums or sludge are to be attained. The oxidant is preferably of such boiling point that a substantial part or nearly all will discharge through line 17 to pipe still 3.

Vapors flow through 19 to contact tower 20 which may also be used as an absorber and oxidizer as by circulating hot dinitrated heavy organic substance from such as benzol or toluol therethrough. Fixed gases or light vapors may be charged by means of line 21 as for example from line 49 later described or from a separate cracking unit. If oxidation is not to be carried out other dissolving agent may be utilized such as a high boiling ether capable of removing impurities. Otherwise molten mass containing alkali or other metal may be flowed through contact tower 20. Treated vapors flow through line 22 to a contact tower 23 containing molten mass with active metal. I prefer that a number of coacting contact towers be used and that they differ in composition of circulating mass, or temperature or both. They are selected so that they coact as by one promoting the action of another. The towers may differ in pressure.

Preferred procedure is disclosed in French Patent No. 756,203. The treating agent containing active metal is preferably prepared as is shown in the French Patent No. 755,875. While the general procedure is shown in the two French patents and in the specification, it is to be understood that oils vary considerably as to composition and quality and it is generally required that each oil to be treated be subjected to experimental tests and trial runs to determine exact mode of operation to be used in view of the market outlet for finished products.

Metal-treated vapors flow through line 24 to fractionator 25 with vapor line 26, condenser 27 and back-flow line 28 and forward-flow line 29. Backflow may be discharged by line 30 to still 31 and through line 32 to still 33. The stills may perform a digestion or agglomeration step as is more clearly set forth in my copending application Ser. No. 672,572. Vapors flow through header 34 to column 25. Residual oil may be discharged from line 35. As the result of experimental work and sales research, it is determined whether this oil is to be marketed or treated as by flow to line 1 or 1' or to 51 or 14 (to be later described). Vapors or gases may be introduced into stills 31 and 32 as for agitation and to promote volatilization or reaction or both. In some instances such vapors will react with the oil as by addition under the boiling temperature especially if some pressure is applied thereto.

Vapors from condenser 27 flow through line 36 to fractionator 37 with vapor outlet 38, condenser 39, back-flow line 40 and forward-flow line 41. Product may be delivered from 15, 29 and 41 for marketing or for subsequent treatment. These lines may be used for sampling to determine the extent of treatment (as by change in temperature, or pressure or time of contact) within the following contact zones. Back-flow discharges through line 42 to still 43 with vapor outlet 44. Vapors flowing through line 45 are treated in contact tower 46 by circulating molten mass with active metal and then passed through line 47 to condenser 48 with vapor line 49 connected with pressure control means and liquid discharge line 50 for the treated distillate which may be of aviation quality gasoline or better.

Residual oil from still 43 or from still 33 may flow through line 51 to reactor 52 with agitator driven by shaft 53 whereat oxidant may be added or whereat a small amount of alkali metal may be added. This unit is preferably in multiple and operated as previously indicated. Treated oil is flowed through line 54, pump 55 and pipe still 56 to "soaking" tank 57. With some oils and for some purposes vessel 52 may be omitted. Vapors or gases, preferably pretreated by metal, may be charged as at 58. Line 59 passes the treated, or cracked and treated, vapors to contact tower 60 and through line 61 to a second contact tower 62. By using two or more contact zones the vapors are more thoroughly treated and coaction may be obtained to further the treatment as by utilizing different composition of circulating mass.

The treated vapors flow through line 63 to fractionator 64 with vapor line 65, condenser 66 forward-flow line 67 and back-flow line 68. Line 69 may connect with evaporation means and vapors returned through line 70. The pressure of the vessels is fixed in accordance with experimental findings. Tower 60 may be used for mildly oxidizing or for introducing fixed gases into the condensate discharged by line 67 by chemical addition under the influence of zone 62. The outflow from line 67 is very stable and of other good qualities.

Residual oil flows from one of vessels 4 through line 71 to reaction vessel 72 with scraping agitator 73. Other oil, preferably pretreated, may be introduced by means of line 74 and separately from or independent of oil from line 71 which it is sometimes not desirable to recover. Such added and treated oil may be obtained by condensation of portions of treated vapors. Alkali metal to the extent of yielding about a quarter of a pound to a pound per barrel during distillation or other separation is introduced as by line 74 with the oil or separately. My preferred mode of operation involves a series of vessels 72 of which one may be used for oxidation. Schematically the oxidant is introduced by means of line 74 with or after the oil and before the metal is added.

Rearrangement occurs to an appreciable degree at above about 250° C. and I preferably use a temperature of about 300° C. or over. This step may be carried out under vacuum whereat lower temperatures may be used. Vapors, including light fractions formed by catalytic rearrangement, may flow through line 75 to condenser 76 with discharge 77 connected with pressure control means. Tank 78 receives treated oil from one of vessels 72. The oil may be treated by contact filtration or a filter aid added without separation of oil or even part thereof. Tank 78 supplies pump 79 which delivers treated oil to drum evaporator or the equivalent 80. If the oil has been substantially freed from solid matter, other types of film evaporators may be used. Overflow returns by line 81 to tank 78. Vapors flow through line 82 to fractionator 83 with vapor outlet 84 and liquid outlet 85 or 85'. The latter discharges heavy oil generally of superior quality. In some instances it is desirable to flow oil from 85' to inlet 74 of vessel 72. Condenser 86 recovers the oil and line 87 is used to withdraw the oil and supply the high vacuum. The parts are built so that the loss in vacuum between 87 and 80 is slight or very small.

The process and apparatus arrangement of my invention is varied to suit the requirements and to conform with characteristics of oil treated. I do not limit my claims to the exact procedure or apparatus illustrated.

I claim:

1. The process of refining petroleum oil which comprises cracking the oil, flowing vapors of the cracked oil through a zone of contact with a molten mass containing an alkali metal at a cracking temperature between 350° C. and 500° C. to influence rearrangement and to remove impurities, fractionating the vapors so treated to separate them into gases, a light fraction, and a heavy fraction, flowing the separated vapors of the light fraction together with the gases through a zone of contact with circulated molten mass containing alkali metal at a temperature of about 300° C. and 500° C. to effect further purification and fractionating the vapors so treated to yield three fractions of different boiling ranges and wherein one is of the gasoline range and colorless.

2. The process of refining petroleum oil which comprises cracking the oil, flowing vapors of the cracked oil through a zone of contact with a molten mass containing an alkali metal at a cracking temperature between 350° C. and 500° C., to influence rearrangement and to remove impurities, fractionating the vapors so treated in a bubble tower while promoting substantial back flow of condensate and applying heat to evaporate said back flow condensate, returning a heavy portion of the back flow condensate to the cracking zone, flowing separated light vapors and gases through a mild oxidizing zone, then passing said vapors and gases through a zone of contact with circulated molten mass containing alkali metal at a temperature between about 300° C. and 500° C. to effect further purification and fractionating the vapors so treated to yield three fractions of different boiling ranges and wherein one is of the gasoline range and colorless.

3. In refining petroleum to produce gasoline which is substantially colorless and stable as regards gum formation, the steps of cracking oil to form substantial amounts of gasoline, then flowing vapors of the cracked oil through a preliminary reaction zone and contacting it therein with a circulated molten mass containing alkali metal at between about 300° C. and about 500° C. to alter and remove impurities as altered and to rearrange substantial portions of the oil molecularly, then flowing the metal-treated vapors through a zone of oxidation and promoting controlled mild oxidation of the vapors therein at elevated temperature to render gum forming portions removable by alkali metal, flowing the so oxidized vapors through a secondary and similarly operated zone of reaction with alkali metal wherein a molten mass containing alkali metal is applied at between 250° C. and 500° C. to purify the vapors, and then fractionating the oil of the vapors and forming therefrom a stable and substantially gum-free gasoline that is colorless.

4. In refining oil of petroleum by treatment of vapors of cracked oil to yield a substantially gumless and colorless gasoline, the process which comprises passing vapors of cracked oil through a multiplicity of zones of contact with molten masses containing alkali metal held at a temperature of above about 300° C. and below about 500° C. to promote molecular rearrangement and to alter impurities and wherein a mild oxidant is applied at a zone between the first and the last of the zones of contact to render gum forming portions removable by the subsequent application of alkali metal, and then fractionating the treated oil to yield a gasoline fraction which has so been substantially freed from gum.

5. The process of refining oil of petroleum which comprises cracking oil, flowing vapors of cracked oil through a zone of contact with a molten mass containing a light active metal such as sodium at a temperature between about 300° C. and 500° C. to promote molecular rearrangement and to remove impurities, then fractionating vapors so treated while promoting substantial condensate back flow and applying heat to evaporate back flow, returning a heavy portion of the back flow to the cracking zone, flowing portions of the fractionated light vapors and gases through a second zone of contact with circulated molten mass containing light active metal such as sodium at between about 300° C. and 500° C. to effect further purification of the vapors, and fractionating the vapors so treated and wherein a mild oxidant is applied to the oil prior to the final treatment with metal.

6. In refining petroleum oil, the process which comprises, vaporizing oil, treating the vapors with a molten mass containing an alkali metal at a temperature between 300° C. and 500° C. to simultaneously promote rearrangement and alteration and removal of impurities, fractionating vapors so treated by flow through a fractionating tower with substantial back flow while applying heat to and evaporating portions of the back flow and to form a heavy liquid oil therefrom, forming and similarly treating vapors of a portion of heavy liquid which is residual to evaporation of said back flow, separately treating a light distillate of gasoline range of the forward flow of the tower by contact of vapors thereof by mild oxidation and application of a similar molten mass, and wherein the oxidation is controlled to render gum forming substances removable by the second molten mass.

7. The process of forming gasoline by cracking petroleum which comprises flowing the oil through a cracking zone and forming vapors containing gasoline, treating the vapors in a contact zone with alkali hydroxide at between about 250° C. and 500° C. to remove impurities, and subsequently contacting the so treated vapors with a molten mass containing substantial amounts of alkali metal at between about 300° C. and about 500° C.

8. The method of claim 7, wherein a mild oxidant is applied to the oil before the treatment with a molten mass containing substantial amounts of alkali metal.

9. In refining petroleum to render it more stable and to separate it into fractions, the process which comprises forming vapors of oil under conditions of cracking, separating therefrom heavy residual oil, treating the vapors of a lighter fraction with alkali metal at between about 300° C. and 500° C. to remove substantial portions of impurities and to promote rearrangement, fractionating the so treated vapors and removing a heavy portion therefrom, treating a lighter portion from which the heavy portion has been removed in vaporous form with alkali metal at between about 300° C. and 500° C. to further purify and improve the oil, and then fractionating the vapors so treated, separating a heavy portion from the so treated portion and flowing light vapors through another similar zone of treatment with alkali metal and liquefying the same to form stable colorless gasoline and treating one of the separated heavy portions of the oil which is of lubricating range with alkali metal at between about 250° C. and 400° C. to further improve the same and to form small portions of lights therefrom and separating the so purified heavy oil from the metal and formed lights as improved lubricating oil of improved stability.

10. In refining petroleum oil to render it unusually stable as regarding formation of gums, sludge, carbon and like byproducts, the process which comprises coactively applying alkali metal to the oil at a temperature of between about 300° C. and about 500° C. a multiplicity of times to promote desirable molecular rearrangement and to alter impurities, and mildly oxidizing the oil two or more times between applications of alkali metal to render gum or sludge forming components removable by subsequently applied metal, and wherein the metal and oxidation treatments are applied and controlled in a manner to yield about maximum stability as regards such stability.

11. The method of claim 10 wherein the temperature of the alkali metal of two or more treatments differs appreciably and the method of two of the treatments differs as to concentration.

JUSTIN F. WAIT.